June 8, 1926.
J. B. HARRIS
WIRE FENCING
Filed March 8, 1926
1,587,725
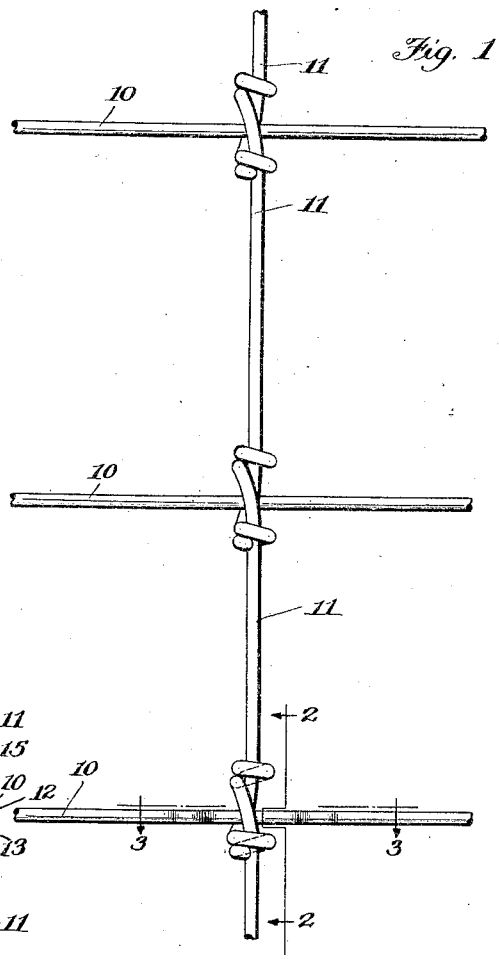
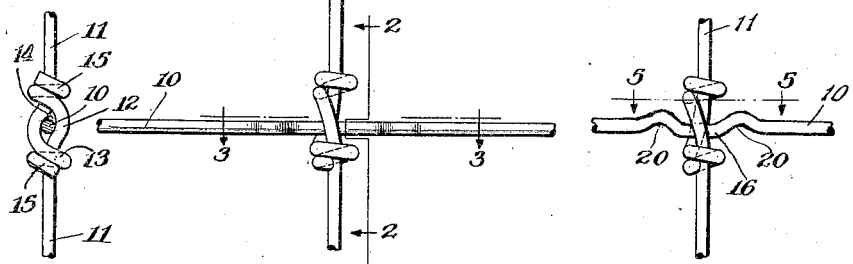
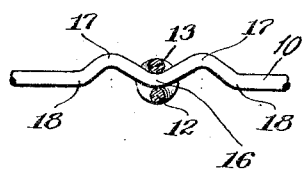
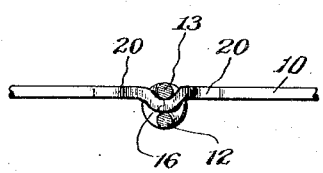
Inventor
James B. Harris
By Nissen & Crane
attys.

Patented June 8, 1926.

1,587,725

UNITED STATES PATENT OFFICE.

JAMES B. HARRIS, OF JANESVILLE, WISCONSIN, ASSIGNOR TO JANESVILLE FENCE & POST CO., OF JANESVILLE, WISCONSIN, A COPARTNERSHIP.

WIRE FENCING.

Application filed March 8, 1926. Serial No. 93,091.

This invention relates to wire fencing construction of the kind using stay wires for holding the line wires in place, and has for its object the provision of stay-wire construction which will permit relative angular movement of the stay wires and line wires in the plane of a fence and which will at the same time prevent slippage of the stay wires along the line wires.

The invention is exemplified in the combination and arrangement of parts shown in the accompanying drawing and described in the following specification, and it is more particularly pointed out in the appended claims.

In the drawing—

Figure 1 is a side elevation of a portion of a stay showing the connection of the stay to the line wires;

Fig. 2 is a section on line 2—2 of Fig. 1;

Fig. 3 is a section on line 3—3 of Fig. 1;

Fig. 4 is a view similar to Fig. 1, showing a modified form of the invention; and Fig. 5 is a section on line 5—5 of Fig. 4.

The numeral 10 designates the line wires of a fence which are held in proper spaced relation by stays consisting of a plurality of short wire sections 11 extending between adjacent line wires. The adjacent ends of the wire sections 11 extend on opposite sides of the co-operating line wire, as shown at 12 and 13. The overlapping portions 12 and 13 are bowed outwardly to provide a passage 14 through which the line wire 10 extends, as clearly shown in Fig. 2. The ends of the stay wire sections are bent about the co-operating sections, as shown at 15, so that the overlapping ends 12 and 13 press tightly against the sides of the line wire 10.

It will be seen that the engagement between the line wires and overlapping ends of the stay wire sections is practically a point engagement, leaving the line wire and stay wire free to move relative to one another about the points of engagement, as a pivot. This angular movement of the line and stay wires is of great advantage where the fence is strung over uneven ground. Where the level of the ground changes, the line wires will assume a different angular relation to the stay wires from that assumed in a level stretch, and if provision is not made for changes in the angular relation of the line and stay wires, the fence will have to buckle and will be bent out of shape so that parts will be placed under undue strain and other parts will not be properly stretched.

Prior to the present invention, difficulty has been experienced in preventing the stay wires from being displaced longitudinally along the line wires. The present invention entirely overcomes this difficulty by providing a short bend or kink in the line wire at the point where the stay wires overlap, as shown at 16 in Fig. 3 of the drawing, and providing additional similar bends or kinks at each side of the stay wires, as shown at 17. It has been found by tests that although a single bend at 16 will afford resistance to slippage of the stay wires, it will not positively hold the stay wires in position under all conditions and that where considerable force is exerted, the stay wires may be slipped from position where a single bend is relied upon for retaining the stay wires. It is found, however, that by placing the additional bend 17 at each side of the band engaged by the stay wire, the stay is so locked in position that it is practically impossible to dislodge it therefrom and a joint is procured which permits angular movement of the line wire and stay and yet which will retain the stay wire in place under all conditions to which the fence is subjected. It is found that where a single bend in a wire is used, displacement may occur when the fence wire is rolled into bundles. The circular form which the wire takes when rolled overcomes the effect of a single bend so that there is danger of displacement of the stay. Where a plurality of bends are used, like that shown in the drawing, the projections at each side of the stay wire will retain the wire in place even though the effect of the bend in the wire directly engaged by the stay, is overcome by the circular position of the wire. It will be seen that each of the bends 17 forms a hump projecting beyond the normal position of the line wire at the side away from the bend which retains the line wire. The line wire is bent back into its normal direction at the points indicated by the numeral 18, in Fig. 3 of the drawing.

As shown in Figs. 4 and 5, the bends at the sides of the stay wire, instead of being in the same plane as the bend 16, may be disposed in a plane at an angle to the bend 16, as indicated at 20. This provides lugs at each side of the bend 16 which will retain the stay wire in place longitudinally of the line wire.

In actual construction and operation, it has been found that the additional lugs entirely overcome the difficulties heretofore experienced in fences of this nature in connection with retaining the stay wires in place on the line wires.

I claim:—

1. Wire fencing comprising line wires and stays extending transversely of said line wires, said stays having openings through which the line wires extend and having contact with said line wires in the planes of said stays transverse to said line wires only, thus leaving said line wires free for pivotal movement relative to said stays in the plane of the fence, the line wires being bent at the point of crossing of said stays and at two spaced points at each of the opposite sides of the stays forming lugs closely adjacent the stays and at each side thereof to hold the stays from displacement along the line wires.

2. Wire fencing comprising line wires and stays conecting said line wires, said stays being formed from sections of wire overlapping each other where the stays cross the line wires, the overlapping portions of said stays being disposed at opposite sides of the line wires and wrapped about each other to hold the overlapping portions of said stays closely adjacent the line wires, each line wire having a crimp therein forming a depression in which one of the overlapping portions of the stay is seated, and having additional crimps at each side of said first-mentioned crimp to form projecting portions for retaining said stay against movement longitudinally of the line wire.

3. Wire fencing comprising line wires and stays connecting said line wires, said line wires having a plurality of successive bends therein closely adjacent each other, each bend being in a different direction from the bend next adjacent thereto to provide three projections in said line wire, the central projection of the three being in a different direction from the end projections, and wire stays having overlapping portions engaging said line wire at said central projection.

4. Wire fencing comprising approximately horizontal line wires provided with a plurality of short crimps formed adjacent each other by bending the wire at closely spaced successive points in different directions, and approximately vertical stays arranged to cross said line wires at points of bending and between adjacent crimps formed in said line wires, said stays having overlapping portions engaging opposite sides of said line wires at their points of crossing, said overlapping portions being wound about each other to hold said portions closely against said line wires.

In testimony whereof I have signed my name to this specification on this 5th day of March A. D. 1926.

J. B. HARRIS.